March 18, 1924. 1,486,968
H. E. KEMPTON
PRECISION DEVICE FOR BORING MACHINES AND THE LIKE
Filed Oct. 12, 1921 3 Sheets-Sheet 1
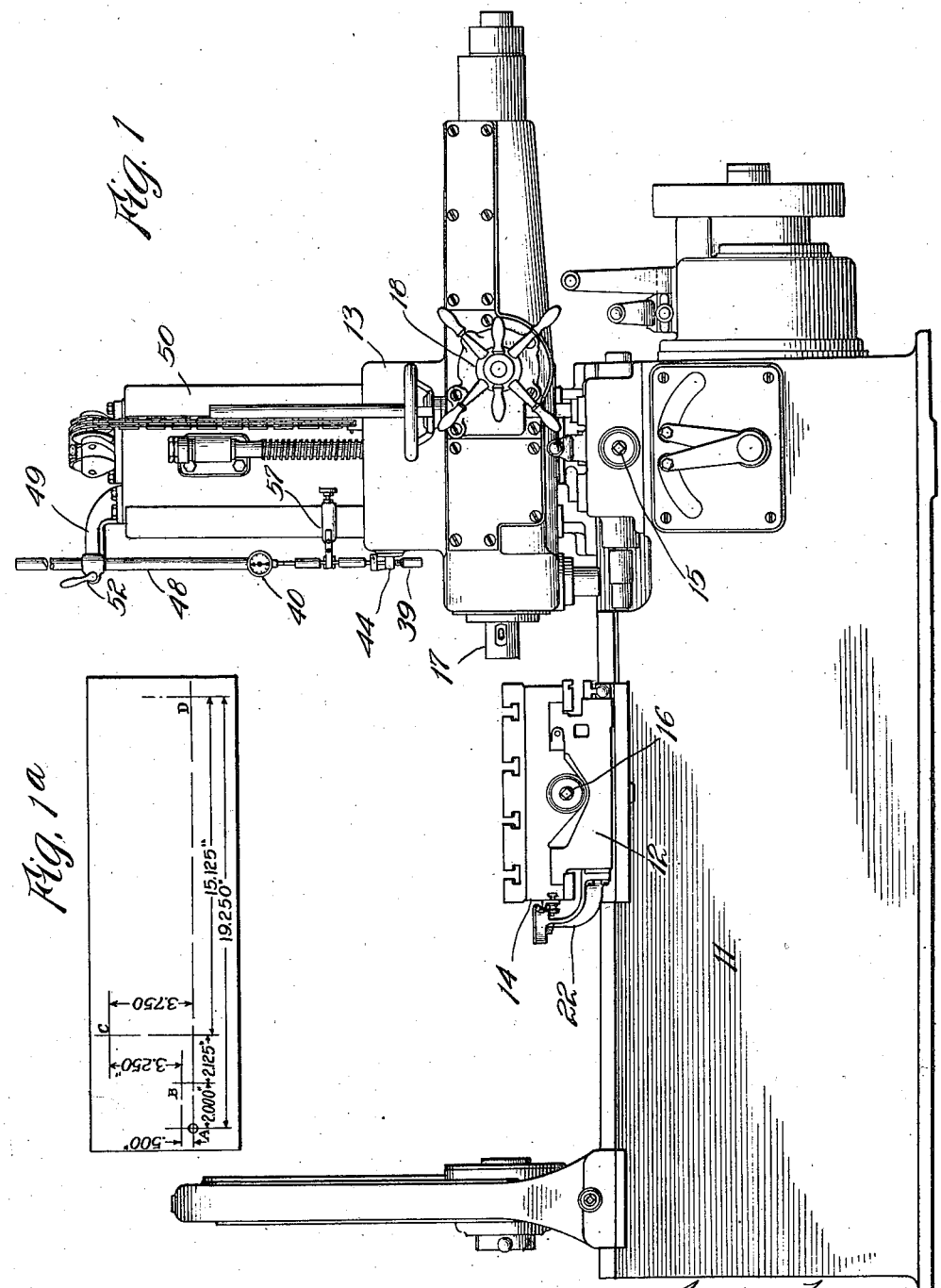
Inventor
H. E. Kempton

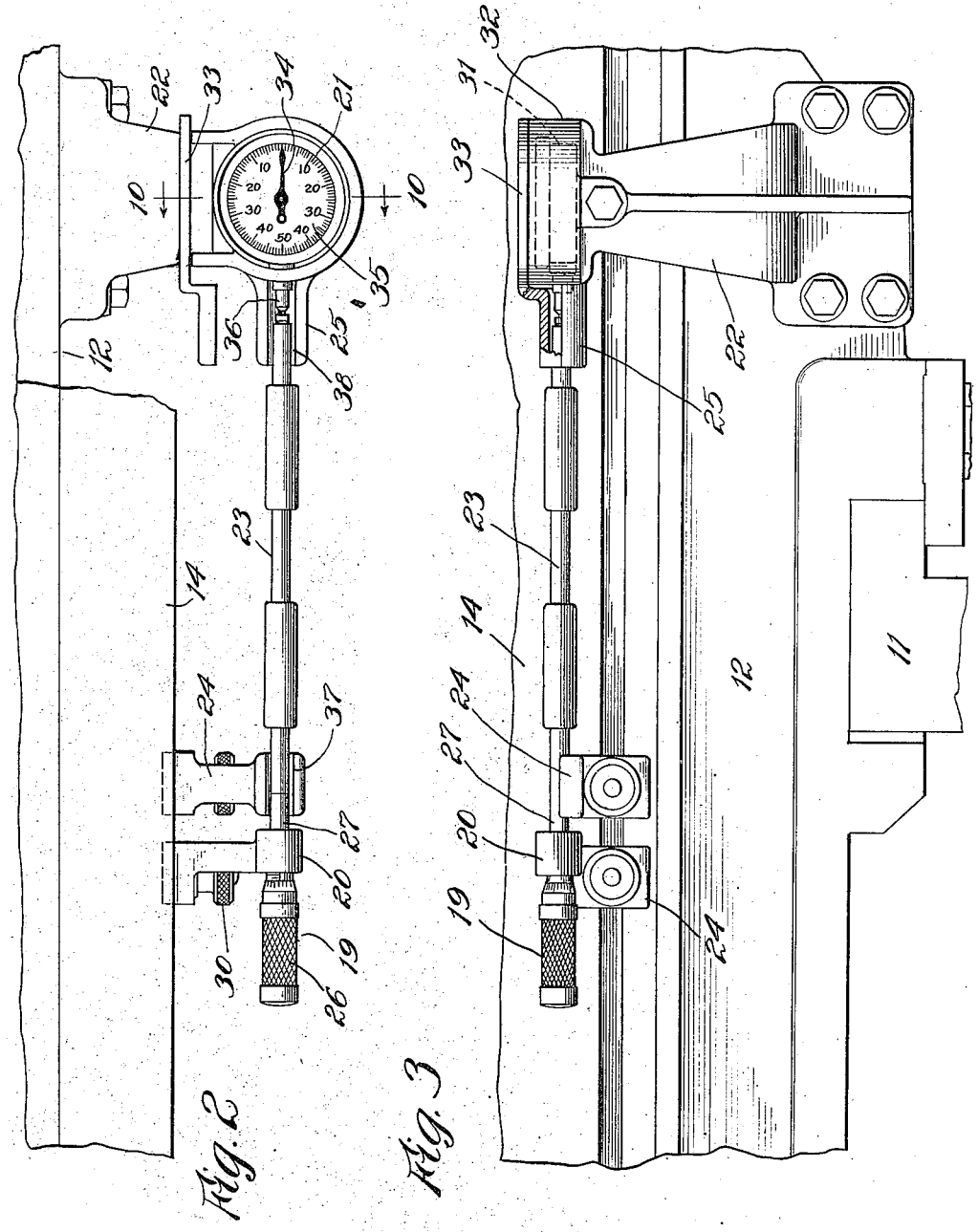

March 18, 1924. 1,486,968
H. E. KEMPTON
PRECISION DEVICE FOR BORING MACHINES AND THE LIKE
Filed Oct. 12, 1921   3 Sheets-Sheet 3
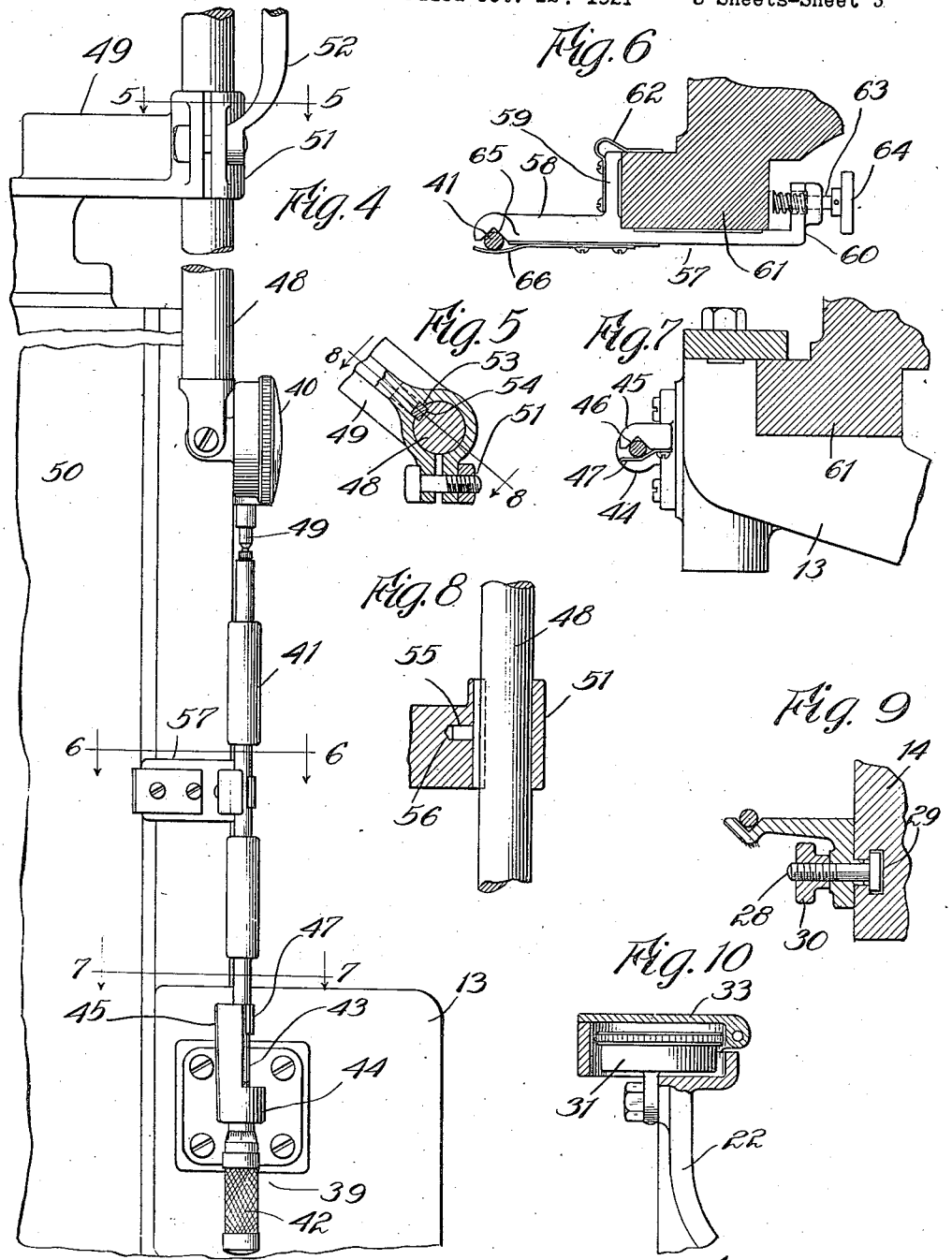
Inventor
H. E. Kempton
By Miller Chindahl Parker
Attys Patented Mar. 18, 1924.

1,486,968

UNITED STATES PATENT OFFICE.

HERBERT E. KEMPTON, OF FOND DU LAC, WISCONSIN, ASSIGNOR TO GIDDINGS & LEWIS MACHINE TOOL COMPANY, OF FOND DU LAC, WISCONSIN, A CORPORATION OF WISCONSIN.

PRECISION DEVICE FOR BORING MACHINES AND THE LIKE.

Application filed October 12, 1921. Serial No. 507,302.

*To all whom it may concern:*

Be it known that I, HERBERT E. KEMPTON, a citizen of the United States, residing at Fond du Lac, in the county of Fond du Lac and State of Wisconsin, have invented certain new and useful Improvements in Precision Devices for Boring Machines and the like, of which the following is a specification.

The invention relates to an attachment for machine tools such as boring machines, which is adapted to facilitate the operation of positioning the work with respect to the boring or cutting tool, or vice versa.

The invention consists primarily in the use of measuring and indicating devices including a micrometer, standard length measuring rods, and a dial indicator, arranged in direct alinement so that the distance to be traversed by the moving part can be accurately measured and any error quickly detected and corrected.

A further object of the invention is to provide a device of the type indicated which is of a thoroughly practical character both from the operative and structural standpoints.

The objects of the invention thus generally stated, together with other and ancillary advantages, may be attained by the construction and arrangement illustrated in the accompanying drawings forming part hereof. It will be understood, however, that the invention is not limited to the particular form, construction or arrangement of the parts, since obviously various changes may be made therein by those skilled in the art without departing from the spirit and scope of the invention as expressed in the appended claims.

Figure 1 of the drawings is a side elevation of a horizontal boring machine embodying my invention. Fig. 1ª is a face view of a piece of work which is to be bored at the points indicated. Fig. 2 is a fragmentary plan view of the measuring and indicating means for the work table. Fig. 3 is a fragmentary side elevation of the same. Fig. 4 is a fragmentary side elevational view of the measuring and indicating means for the vertically movable head of the machine. Figs. 5, 6 and 7 are horizontal sectional views taken respectively in the planes of lines 5—5, 6—6 and 7—7 of Fig. 4 and showing details of construction. Fig. 8 is a sectional view taken on line 8—8 of Fig. 5. Fig. 9 is a detail view illustrating one of the supports for measuring rods of the horizontal precision device. Fig. 10 is a sectional view taken in the plane of line 10—10 of Fig. 2.

Referring first to Fig. 1, 11 designates the base of a horizontal boring machine upon which is mounted a saddle 12 for horizontal movement, and 50 indicates the column of the machine, which carries a head 13 for vertical sliding movement. The saddle 12 is arranged to be slid longitudinally of the base 11 in the usual way and by means of any suitable mechanism; and mounted upon the saddle for transverse movement is a work-carrying table 14. Herein the saddle 12 and the head 13 are adapted for operation through the medium of a single operating stem 15 adapted to receive a suitable hand wheel, and the table 14 is adapted to be slid laterally upon the saddle 12 by means of a hand wheel engaging an operative stem 16. 17 designates the spindle for receiving the boring tool which is fed horizontally into operative engagement with the work clamped upon the table 14 by any suitable means, such, for example, as the hand wheel 18.

As herein shown, the precision device for the work table 14 is mounted upon the forward side of the saddle 12. Referring to Figs. 2 and 3, this device comprises a pair of gage elements in the form of a micrometer and a dial indicator, one of which is mounted for movement with the movable part or table and the other of which is relatively stationary. Herein the micrometer, indicated at 19, is the movable element and is adjustably supported by means of a bracket 20 upon the forward side of the table; the indicator 21, on the other hand, is stationarily supported by means of a bracket 22 on the forward side of the saddle 12. In combination with these gage elements, I employ measuring rods 23 of standard length supported by means of a bracket 24 upon the table and an extension arm 25 of the bracket 22 on the saddle 12.

The micrometer 19 is of ordinary construction adapted to measure fractions of an inch up to tens of thousandths and comprises the usual barrel 26 and rod or stem 27 which adapted to move longitudinally through the bracket 20. This bracket and also the bracket 24 are mounted in the side of the table 14 for movement longitudinally thereof. Thus referring to Fig. 9, each of these devices is secured to the table by means of a bolt 28 having its head slidable in a T-slot 29 extending longitudinally of the table. The bolt is provided with a thumb nut 30 whereby the bracket may be clamped in position.

The indicator 21 is also of usual construction, comprising a casing 31 mounted within a housing 32 formed upon the bracket 22 and having a hinged cover 33. 34 designates the pointer of the indicator, 35 the dial and 36 the yieldable stem which is operatively associated with the pointer. Said stem extends laterally through the housing so as to be disposed in alinement with the measuring rod 23 and the micrometer stem 27. The bracket 24, and extension arm 25 of the bracket 22, are provided with V-shaped grooves 37 and 38 for receiving the ends of the measuring rod 23, as well as the ends of the stems 27 and 36 of the micrometer and indicator. The measuring rod may thus be readily removed and replaced from time to time as may be desired.

Referring now to Figs. 4 to 8, inclusive, the precision device for the vertically movable head 13 comprises, as in the case of the device for the table 14, a micrometer 39, an indicator 40 and a measuring rod 41. The micrometer constitutes in this instance also, the movable gage element and comprises the usual barrel 42 and stem 43 mounted to slide longitudinally through a bracket 44 secured to the forward side of the head. This bracket has an upward extension 45 provided with a V-shaped groove 46 for receiving the stem 43 of the micrometer and the lower end of the measuring rod 41. 47 is a spring arm secured to the extension 45 and adapted to retain the measuring rod in the groove 46.

The indicator 40 is in this instance mounted upon the lower end of a rod 48 with its stem 49 in axial alinement with the measuring rod 41. The rod 48 is mounted for vertical adjustment in a bracket 49 carried by the upper end of the column 50 of the machine, the outer end of the bracket being in the form of a split collar 51 having a suitable clamping device 52. By this means it will be observed, the indicator may be adjusted up and down as desired. Suitable means is provided for preventing the rod 48 from rotating. This means (Figs. 5 and 8) comprises a key 53 operating in a groove 54 in the rod and held against sliding movement by means of a stud 55 entered in a socket 56 in the bracket.

The measuring rod 41 is detachably secured to the column by means of a clamp 57 (Fig. 6), comprising an arm 58 having a pair of spaced jaws 59 and 60 adapted to straddle a portion 61 of the column. The jaw 59 is provided with a spring clip 62 adapted to engage with the rear side of the part 61 of the column, and the jaw 60 has a spring pressed plunger 63 frictionally engaging the part 61 upon the side opposite the arm 59. Said plunger has a head 64 by means of which the plunger may be withdrawn from engagement with the part 61. The end of the arm 58 has a V-shaped groove 65 therein for receiving the measuring rod 41, and a spring member 66 secured to the arm 58 yieldingly holds the rod 41 in said groove. It will be seen that by this means the clamp 57 for the measuring rod 41 may be quickly and easily attached and detached from the column.

The method which I prefer to employ in variously positioning the boring bit or other tool and the work with respect to each other is as follows:—Initially a definite relationship between these parts is established, as by clamping the work in place and boring a hole therein at one of the points which define the extent of movement desired. This done, one of the gage elements (herein the movable element or micrometer) is adjusted a greater distance from the stationary gage element (the dial indicator) than the maximum distance to be traversed horizontally or vertically as the case may be. This is accomplished by the use of suitable measuring rods, the micrometer and indicator being preferably set at zero, with the indicator stem under tension. The extent of movement to be imparted to the movable part being known, the distance between the gage elements is decreased, either through the substitution of the measuring rod or the adjustment of the micrometer to an extent exactly equal to the desired movement. The movable part is then adjusted until such decrease in the maximum distance is taken up, any additional movement being shown by the indicator.

By way of illustration of the method employed, reference is made to Fig. 1ª of the drawings in which I have shown the face of a piece of work which is to be bored at all of the points A, B, C and D. The horizontal distance between the points A and D is in this instance the maximum horizontal distance to be traversed and is 19.250". The space between a line drawn horizontally through the point A, and the point C, the maximum vertical distance to be traversed, is 3.750". Initially, therefore, the precision device for the table must be set to measure a distance greater than 19.250". This is accomplished by placing a 20" measuring rod 23, in the V-shaped grooves 37 and 38, and setting the micrometer and indicator both at zero. Likewise the precision device for the head of the machine is set to measure a maximum distance greater than 3.750. This is accomplished by interposing a 4" measuring rod between the gage elements 39 and 40, both of which are set at zero. It will be observed that in measuring off the maximum distances to be traversed in the horizontal and vertical directions, the measurement is effected solely by the measuring rods, the micrometer and indicator being set at zero. In this operation, the parts are relatively adjusted so that the measuring rods engage the stems of the indicators, exerting tension thereon so as to turn the pointers zeyond zero. The dials are then adjusted to zero position in the well known manner.

Let it be assumed that the work has been clamped upon the table 14 and a definite relationship established between the work and the tool by boring a hole at point A. The next hole to be bored is at point B, which is .500" above and 2.000" to the right. Accordingly the micrometer 39 for the head is backed off until it reads .500 and the head is then raised to take up the distance thus subtracted, care being exercised that the desired extent of movement, viz, .500, is not exceeded. When the micrometer was adjusted, the pointer of the indicator which, as above noted, was initially placed under spring tension, moved away from its zero position, the measuring rod being free to slide longitudinally in its supporting grooves. Consequently when the head was raised, the indicator pointer was gradually moved back toward its initial or zero position. Such movement of the indicator pointer enables the operator to determine exactly when the desired movement has taken place. In the event that the desired movement was exceeded, the operator must reverse or lower the head and again approach the zero point on the indicator as originally.

The vertical movement of the head having thus been accomplished, the next step is to move the work horizontally a distance of 2.000", which is the lateral distance between points A and B. This is accomplished by substituting for the 20" measuring rod in the horizontal precision device an 18" rod, and moving the table to the left until the indicator pointer, which moved out of its zero position upon the removal of the 20" rod, again registers zero. The hole B is then bored.

The next hole to be bored is that at point C. To do this the head must be raised a distance of 3.250" and the work moved laterally to the left a distance of 2.125". In the first case, that is, in the movement of the head, the 4" measuring rod 41 is replaced by a one inch measuring rod, and the micrometer backed off an additional .250" until it reads .750. By the substitution of the one inch measuring rod for the 4" measuring rod 41, 3" are subtracted, and by the operation of the micrometer, .250" were subtracted, the same being the desired extent of movement of the head. The head is then raised until the indicator reads zero.

The next step is to move the work to the left the distance between point B and a vertical line drawn through point C. In measuring this distance, a 16" measuring rod is substituted for the 18" rod, and the micrometer on the table backed off until it reads .125. The total distance of 2.125 is thus subtracted from the initial or maximum distance, and the table operated to the left until the indicator registers zero. The work is now in position to be drilled at the point C.

In positioning the parts for the boring of the hole at point D, the head is lowered to carry its spindle a slight distance below a horizontal line drawn through the point D which is 3.750" below point C. The 4" measuring rod is then replaced, and the micrometer adjusted to read zero. The head is now moved vertically from its position below said horizontal line until the indicator registers zero.

The distance now to be traversed laterally in order to position the work so that the point D may be drilled is 15.125". Therefore the 16" measuring rod 23 is replaced by a one inch measuring rod and the micrometer backed off .125" or to .750. Thus the desired extent of movement, viz, 15.125 is subtracted from the measuring devices, the micrometer previously having read .625. The table is now moved to the left until the indicator registers zero, whereupon the hole may be bored at point D.

It will be seen that I have produced a novel system of accurately positioning the parts with respect to each other, which is extremely simple and yet susceptible of use with the highest degree of accuracy. The micrometer and measuring rods constitute the means for measuring the distance to be traversed, and the indicator is operatively associated with the measuring devices in such a manner as to readily show when the desired movement has been effected.

Obviously the invention is adaptable to use in machine tools of various kinds where it is essential that the work and the tool be quickly and accurately positioned with respect to each other.

I claim as my invention:

1. In a boring machine or the like, a precision device comprising an indicator, measuring means with which said indicator is adapted to coact, and means for supporting the indicator for adjustment upon one of two relatively movable parts of the machine, said means comprising a bracket secured to one of said parts, a rod entered through the bracket, and means for clamping the rod in the bracket so as to permit of the adjustment of the indicator with respect to the measuring means.

2. In a boring machine or the like, the combination of a vertical column, a precision device including a micrometer and an indicator, a bracket secured upon one of the two relatively movable parts of the machine and adapted to support said micrometer for vertical adjustment therein, a bracket secured to the other one of said parts, and a rod mounted in said bracket and providing a vertically adjustable support for the indicator.

3. In a boring machine or the like, the combination of a vertical column, a head movable vertically on the column, a pair of gauge elements mounted respectively on the relatively movable parts, and means for maintaining a measuring rod in vertical position aligned with said gauge elements, one of said elements being adapted to register the movement of said head with respect to said column.

In testimony whereof, I have hereunto set my hand.

HERBERT E. KEMPTON.